United States Patent

[11] 3,617,175

[72] Inventors Reinhard Mohr
Offenbach am Main;
Fritz Osterloh, Bad Soden Taunus, both of Germany
[21] Appl. No. 431,719
[22] Filed Feb. 10, 1965
[45] Patented Nov. 2, 1971
[73] Assignee Farbwerke Hoechst vormals Meister Lucius & Bruning
Frankfurt am Main, Germany
[32] Priorities Feb. 14, 1964
[33] Germany
[31] F 42001; F 42003

[54] DYEING NICKEL-MODIFIED POLYOLEFIN WITH BENZAMIDAZOLEAZO, BENZTRIAZOLEAZO, OR QUINOXALINEAZO DYES MODIFIED BY CHLORIN, LOWER ALKYL OR LOWER ALKOXY GROUPS OR 5-IMINO-4,5-DIHYDRO-1,2,4-TRIAZOLEAZO DYES
6 Claims, No Drawing Figs.

[52] U.S. Cl. .............................................. 8/42
[51] Int. Cl. ............................................. D06p1/10
[50] Field of Search ........................................ 8/42, 41, 55 BU; 260/154, 157

[56] References Cited
UNITED STATES PATENTS 2,308,023  1/1943  Peterson............... 260/157X
3,321,266  5/1967  Wunderlich et al........  8/42

FOREIGN PATENTS
642,346  5/1964  Belgium.................. 8/55BU-1
112,395  12/1962  Pakistan................. 260/157

*Primary Examiner* — Donald Levy
*Attorneys* — Connolly and Hutz

ABSTRACT: Textile materials of nickel-containing polypropylene are dyed and printed deep shades having excellent fastness properties with azo dyestuffs of the formula
Y—N=N—A,
wherein Y is

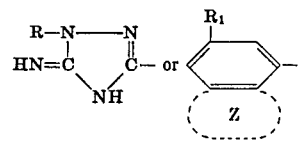

wherein R is phenyl or substituted phenyl, $R_1$ is halogen, alkyl or alkoxy, Z is the members required for the completion of an imidazole, triazole or 1,4-diazine ring, and A is the radical of a 1-hydroxy-4-halogenbenzene, 1-hydroxy-4-alkoxybenzene, 1-hydroxy-4-alkylbenzene, 3-hydroxy-diphenylamine, 2,4-dihydroxy-1-acylbenzene, 2-hydroxynapthalene, 2-hydroxynapthalene-3-carboxylic acid, 2-hydroxynapthalene-3l Ccarboxylic acid methylester, 2-hydroxycarbazole, 3-hydroxy-dipheylene oxide or 1-phenyl-3-methyl-5-pyrazolone.

DYEING NICKEL-MODIFIED POLYOLEFIN WITH BENZAMIDAZOLEAZO, BENZTRIAZOLEAZO, OR QUINOXALINEAZO DYES MODIFIED BY CHLORINE, LOWER ALKYL OR LOWER ALKOXY GROUPS OR 5-LIMINO-4,5-DIHYDRO-1,2,4-TRIAZOLEAZO

We have found that textile materials made of nickel-containing polypropylene can be dyed and printed deep shades having excellent fastness properties by using azo dyestuffs of the general formula Y—N=N—A,
wherein Y represents one of the groupings

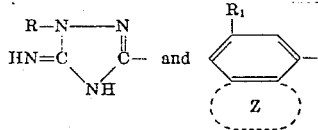

in which R represents a phenyl radical which may contain substituents, $R_1$ stands for a halogen atom, an alkyl or an alkoxy group, Z represents the members required for the completion of an imidazole, triazole or 1,4-diazine ring, and A represents the radical of a 1-hydroxy-4-halogenbenzene, 1-hydroxy-4-alkoxybenzene, 1-hydroxy-4-alkybenzene, 3-hydroxy-diphenylamine, 2,4-dihydroxy-1-acylbenzene, 2-hydroxynaphthalene, 2-hydroxynaphthalene-3-carboxylic acid, 2-hydroxyhaphalene-3-carboxylic acid methylester, 2-hydroxycarbazole, 3-carboxylic acid methylester, 2-hydroxy-carbazole, 3-hydroxy-diphenylene oxide or 1-phenyl-3-methyl-5 pyrazolone.

The dyeing is carried out by treating the textile material made of polypropylene containing 0.05–1 percent of nickel in an aqueous dyebath containing the dyestuff and, if desired, a carrier, at a temperature within the range from about 90° to 140° C. and by completing the dyeing obtained in the usual manner. It is recommendable but not imperative to add to the dyebath a wetting or a dispersing agent.

The printing is advantageously carried out by dissolving the dyestuff in a suitable solvent, for example dimethylformamide, and stirring the dyestuff solution into a suitable thickening agent, for example crystal gum. After application of the printing paste which may contain in addition, commonly used printing auxiliary agents, the printed fabric is steamed at a temperature within the range from about 101° to 140° C. and then treated in the usual manner. It is also possible to add carriers to the printing paste.

Suitable carriers are, for instance, di- and trichlorobenzenes, chloronaphthalenes, methylnaphthalenes, benzoic acid butylester, ortho-phenylphenol or hydroxytoluene-carboxylic acid methylester.

The dyeing and steaming can be carried out at a $p_H$-value within the range from 2 to 11, preferably from 3 to 8.

The dyestuffs used in the process of the invention show a good affinity for textile material consisting of nickel-containing polypropylene and produce chiefly yellow, orange, red, brown, blue and violet dyeings or prints having an excellent fastness to light and wetting as well as a good fastness to solvents, rubbing, and waste gases.

The dyestuffs used can be prepared in the usual manner by coupling diazotized 1-phenyl-3-amino-5-imino-4,5dihydro-1,2,4-triazole or its derivatives which carry substituents at the phenyl radical or diazotized 7-aminobenzimidazoles, 7-aminobenztriazoles or 5-aminoquinoxalines with the corresponding coupling components.

The following examples serve to illustrate the invention but they are not intended to limit it thereto, the parts being by weight unless otherwise stated and the relationship of parts by weight to parts by volume being that of the kilogram to the liter.

EXAMPLE 1

10 Parts of a polypropylene yarn made of staple fiber having a single titer of 3 den and a 0.75 percent by weight content of the nickel compound of 3,3'-dihydroxy-5,5'-dioctyldiphenylsulfone are washed for 30 minutes at 60° C. with an aqueous solution containing per liter of water 0.3 g. of the product obtained by addition of 1 mol of nonylphenol to 11 mols of ethylene oxide, rinsed and then treated without intermediate drying in a bath containing per 400 parts of water 0.1 part of acetic acid, 0.04 part of sodium dibutylnaphthalenesulfonate, 0.3 part of dinaphthylmethane-di-sulfonic acid and 0.2 part of the azo dyestuff obtained by coupling diazotized 1-phenyl-3-amino-5-imino-4,5-dihydro-1,2,4-triazole with 2-hydroxynaphthalene. After dying for 10 minutes at room temperature the temperature of the dyebath is raised to 100° C. within 45 minutes and the material dyed for 2 hours at this temperature. The dyed yarn is then rinsed with hot and with cold water, washed for 30 minutes at 80° C. with an aqueous solution containing per liter of water 1 g. of the product obtained by addition of 1 mol of nonylphenol to 11 mols of ethylene oxide and 0.4 g. of sodium carbonate, rinsed and dried.

A bluish red dyeing is obtained showing an excellent fastness to washing, perspiration, solvents, light, and rubbing.

EXAMPLE 2

10 parts of a polypropylene yarn made of staple fiber having a single titer of 3 den of and a nickel content of 0.05 percent by weight are dyed in the dyebath described in example 1 and under the same dyeing conditions, but with the use of 0.2 part of the azo dyestuff obtained by coupling diazotized 1-phenyl-3-amino-5-imino-4,5-dihydro-1,2,4with 1-phenyl-3-methyl-5 pyrazolone and with an addition of 2 parts of methylnaphthanelen.

A yellow dyeing is obtained showing an excellent fastness to light, washing, perspiration, solvents, and rubbing.

EXAMPLE 3

50 Parts of the dyestuff obtained from diazotized 1-phenyl-3-amino-5-imino-4,5-dihydro-1,2,4-triazole and --hydroxy-4-chlorobenzene are dissolved in 300 parts dimethylformamide. The solution is stirred into 600 parts of a 25 percent by weight aqueous crystal gum thickening and 50 parts of ammonium sulfate are added.

A polypropylene fabric is printed with the printing paste obtained in this manner according to the film printing process. The printed fabric is dried steamed during 30 minutes at 1.5 atmospheres gauge pressure, rinsed thoroughly, after treated for 30 minutes at 80° C. with a solution containing per liter of water 1 g. of the product obtained by the action of about 10 mols of ethylene oxide on 1 mol of nonylphenol and 0.5 g. of soda ash, rinsed again and dried. A full violet print is obtained having a good fastness to light and wet processing.

EXAMPLE 4

10 Parts of a polypropylene yarn made of staple fiber having a single titer of 3 den and a nickel content of 0.05 percent by weight are washed for 30 minutes at 60° C. with a solution containing per liter of water 0.3 g. of the product obtained by addition of 1 mol of nonylphenol to 11 mols of ethylene oxide, rinsed and subsequently treated without intermediate drying on a high-temperature dyeing apparatus in a bath containing per 400 parts of water 0.1 part of acetic acid, 0.04 part of sodium dibutylnaphthalenesulfonate, 0.2 part of the azo dyestuff obtained by coupling diazotized 1-phenyl-3-amino-5-imino4,5-dihydro-1,2,4-triazole with 1-hydroxy-4-methoxybenzene. After dyeing for 10 minutes at room temperature the temperature of the dyebath is raised to 120° C. within 60 minutes and the material is dyed for 2 hours at this temperature. The dyed yarn is then rinsed with hot and with cold water, washed during 30 minutes at 80° C. with an aqueous solution containing per liter of water 1 g. of the product obtained by addition of 1 mol of nonylphenol to 11 mols of ethylene oxide and 0.4 g. of sodium carbonate, washed, rinsed and dried.

A blue dyeing is obtained which has an excellent fastness to light, washing, perspiration, solvents, and rubbing.

The following table lists a number of further dyestuffs suitable for use in the process of the invention as well as the tints obtained by means of them:

| Dyestuff obtained from diazotized 1-phenyl-3-amino-5-imino-4,5-dihydro-1,2,4-triazole | Tint |

| | |
|---|---|
| and | |
| 2-hydroxynaphthalene-3-carboxylic acid | red |
| 2,4-dihydroxy-1-acetylbenzene | orange |
| 2-hydroxycarbazole | brown |
| 3-hydroxydiphenylene oxide | maroon |
| 3-hydroxydiphenylamine | brown |

EXAMPLE 5

10 Parts of a polypropylene yarn made of staple fiber having a single titer of 3 den and a 0.75 percent by weight content of the nickel compound of 3.3'dihydroxy-5,5'-dioctyldiphenyl-sulfone are washed for 30 minutes at 60° C. with an aqueous solution containing per liter of water 0.3 g. of the product obtained by addition of 1 mol of nonylphenol to 11 mols of ethylene oxide, rinsed and dried. The material is then treated without intermediate drying in a bath containing per 400 parts of water 0.1 part of acetic acid, 0.04 part of sodium dibutyl-naphthalene-sulfone, 0.3 part of dinaphthylmethane-disulfonic acid and 0.2 part of the azo dyestuff obtained by coupling diazotized 5-amino-2,3-dimethyl-7-chloroquinoxaline with 1-hydroxy-4-methoxybenzene. After dyeing for 10 minutes at room temperature the temperature of the dyebath is raised to 100° C. within 45 minutes and the material is dyed for 2 hours at this temperature. The dyed yarn is then rinsed with hot and with cold water, washed for 30 minutes at 80° C. with an aqueous solution containing per liter of water 1 g. of the product obtained by addition of 1 mol of nonylphenol to 11 mols of ethylene oxide and 0.4 g. of sodium carbonate, rinsed and dried. A greenish blue dyeing is obtained showing an excellent fastness to washing, perspiration, solvents, light, waste gases, and rubbing.

EXAMPLE L6

10 Parts of a knit fabric made of polypropylene yarn having a single titer of 6 den and a 0.75 percent by weight content of the nickel compound of 3,3'-dihydroxy-5,5'dioctyldiphenyl-sulfone are washed for 30 minutes at 60° C. with an aqueous solution containing per liter of water 0.3 g. of the product obtained by addition of 1 mol of nonylphenol to 11 mols of ethylene oxide, rinsed and subsequently treated without intermediate drying in a bath containing per 400 parts of water 0.1 part of acetic acid, 0.04 part of sodium dibutylnaphthalenesulfonate, 0.3 part of dinaphthylmethanedisulfonic acid, 2 parts of 2-hydroxy-toluene-3-carboxylic acid methylester and 0.4 part of the azo dyestuff obtained by coupling diazotized 7-amino-2-methyl-5-chlorobenzimidazole with 1-phenyl-3-methyl-5-pyrazolone. After dyeing for 10 minutes at room temperature the temperature of the dyebath is raised to 100° C. within 45 minutes and the material is dyed for 2 hours at this temperature. The dyed fabric is then rinsed with hot and with cold water, washed for 30 minutes at 80° C. with an aqueous solution containing per liter of water 1 g. of the product obtained by addition of 1 mol of nonylphenol to 11 mols of ethylene oxide and 0.4 g. of sodium carbonate, rinsed and dried. A reddish yellow dyeing is obtained which has excellent fastness properties to light, washing, perspiration, solvents, and rubbing.

EXAMPLE 7

10 Parts of a polypropylene yarn made of staple fiber having a single titer of 3 den and a nickel content of 0.05 percent by weight are dyed as described in example 1, but using 0.2 part of the dyestuff obtained by coupling diazotized 7-amino-5-chlorobenzimidazole with 1-hydroxy-4-chlorobenzene instead of the dyestuff used in example 1 and with an addition of 2 parts of methylnaphthalene. A deep bordeaux dyeing is obtained having excellent fastness properties to light, washing, perspiration, solvents, waste gases, and rubbing.

EXAMPLE 8

10 Parts of a polypropylene yarn made of staple fiber having a single titer of 3 den and a nickel content of 0.05 percent by weight are dyed in the dyebath and under the dyeing conditions described in example 1, but with the use of 0.2 part of the azo dyestuff obtained by coupling diazotized 7-amino-2-methyl-5-chlorobenzimidazole with 1-hydroxy-4-chlorobenzene and with an addition of 2 parts of ortho-phenylphenol. A deep bordeaux dyeing is obtained having an excellent fastness to light, washing, perspiration, and rubbing.

EXAMPLE 9

50 Parts of the dyestuff obtained from diazotized 7-amino-5-chloro-benzimidazole and 1-hydroxy-4-methoxybenzene are dissolved in 300 parts of dimethylformamide. The solution is stirred into 600 parts of a 25 percent aqueous crystal gum thickening and 50 parts of ammonium sulfate and 50 parts of ammonium oxalate are added.

A polypropylene fabric is printed by film printing with the printing paste obtained in this manner. The printed fabric is dried and steamed for 30 minutes at 1.5 atmospheres gauge pressure, rinsed thoroughly, aftertreated for 30 minutes at 80° C. with a solution containing per liter of water 1 g. of the product obtained by the action of about 10 mols of ethylene oxide on 1 mol of nonylphenol and 0.5 g. of soda ash, rinsed again and dried. A violet print is obtained having a good fastness to light and to water.

EXAMPLE 10

10 Parts of a polypropylene yarn made of staple fiber having a single titer of 3 den and a nickel content of 0.05 percent by weight are dyed as described in example 1, but using 0.3 part of the azo dyestuff obtained by coupling diazotized 7-amino-5-chlorobenzimidazole with 2,4-dihydroxy-1-acetylbenzene and with an addition of 2 parts of trichlorobenzene. A deep red dyeing is obtained showing excellent fastness properties to light, washing, perspiration, solvents, waste gases, and rubbing,

EXAMPLE 11

10 Parts of a polypropylene yarn made of staple fiber having a single titer of 3 den and a nickel content of 0.05 percent by weight are washed for 30 minutes at 60° C. with an aqueous solution containing per liter of water 0.3 g. of the product obtained by addition of 1 mol of nonylphenol to 11 mols of ethylene oxide, rinsed and subsequently treated without intermediate drying on a high-temperature dyeing apparatus in a bath containing per 400 parts of water 0.1 part of acetic acid, 0.04 part of sodium dibuthlnaphthalenesulfonate and 0.2 part of the azo dyestuff obtained by coupling diazotized 7-amino-2-methl-5-chlorobenzimidazole with 2,4-dihydroxy-1-acetyl-benzene. After dyeing for 10 minutes at room temperature the temperature of the dyebath is raised to 120° C. within 60 minutes and the material is dyed for 2 hours at this temperature. The dyed yarn is then rinsed with hot and with cold water, washed for 30 minutes at 80° C. with an aqueous solution containing per liter of water 1 g. of the product obtained by addition of 1 mol of nonylphenol to 11 mols of ethylene oxide and 0.4 g. of sodium carbonate, rinsed and dried.

A deep yellowish red dyeing is obtained showing excellent fastness properties to light, washing, perspiration, solvents, and rubbing.

The following table lists a number of further dyestuffs suitable for use in the process of the invention as well as the tints obtained by means of them:

| Dyestuff | | Tint |
|---|---|---|
| 7-amino-5-chlorobenzimidazole | 1-phenyl-3-methyl-5-pyrazolone | yellow |
| 7-amino-5-chlorobenzimidazole | 2-hydroxy-naphthalene | red violet |

| | | |
|---|---|---|
| 7-amino-5-chlorobenzimidazole | 1-hydroxy-4 methylbenzene | red violet |
| 7-amino-5-chlorobenzimidazole | 3-hydroxy-diphenylene oxide | maroon |
| 7-amino-5-chlorobenzimidazole | 3-hydroxy-diphenylamine | violet |
| 7-amino-5-chlorobenzimidizole | 1-hydroxy-4 methoxybenzene | blue |
| 7-amino-2-methyl-5chlorobenzimidazole | 2-hydroxynaphthalene | bordeaux |
| 7-amino-2-methyl-5-chlorobenzimidazole | 1-hydroxy-4-methylbenzene | bordeaux |
| 7-amino-2-methyl-5-chlorobenzimidazole | 2-hydroxycarbazole | violet |
| 7-amino-2-methyl-5-chlorobenzimidazole | 3-hydroxy-diphenylene oxide | grey |
| 7-amino-2-methyl-5-chlorobenzimidazole | 2-hydroxynaphthalene-3-carboxylic acid methylester | red violet |
| 7-amino-2-methyl-5-chlorobenzimidazole | 3-hydroxy-di phenylamine | bordeaux |
| 7-amino-2-methyl-5-chlorobenzimidazole | 1-hydroxy-4-methoxybenzene | blue |
| 7-amino-2-hydroxy-5-methyl-benzimidazole | 1hydroxy-4-methoxybenzene | red |
| 7-amino-2-hydroxy-5-methyl-benzimidazole | 1-hydroxy-4-methylbenzene | red brown |
| 7-amino-2-hydroxy-5methyl-benzimidazole | 2-hydroxynaphthalene | red |
| 7-amino-2-hydroxy-5-methyl-benzimidazole | 2,4-dihydroxy-1-acetylbenzene | yellow |
| 7-amino-5-chlorobenztriazole | 1-phenyl-3-methyl-5-pyrazolone | orange |
| 7-amino-5-chlorobenztriazole | 1-hydroxy-4-methylbenzene | brown |
| 7-amino-5-chlorobenztriazole | 2,4-dihydroxy-1-acetylbenzene | red brown |
| 7-amino-5-chlorobenztriazole | 3-hydroxy-diphenylene oxide | brown |
| 7-amino-5-chlorobenztriazole | 2-hydroxynaphthalene-3-carboxylic acid methylester | red violet |
| 7-amino-5-chlorobenztriazole | 3-hydroxy-diphenylamine | red violet |
| 7-amino-5-chlorobenztriazole | 1-phenyl-5-methyl-5-pyrazolone | yellow |
| 7-amino-5-chlorobenztriazole | 2-hydroxynaphthalene | red |
| 7-amino-5-chlorobenztriazole | 1-hydroxy-4-methoxybenzene | grey |
| 5-amino-2,3,7-trimethyl-quinoxaline | 2-hydroxynaphthalene | red violet |
| 5-amino-2,3,7-trimethyl-quinoxaline | 1-phenyl-3-methyl-5-pyrazolone | orange |
| 5-amino-2,3,7-timethyl-quinoxaline | 2,4-dihydroxy-1-acetylbenzene | red |
| 5-amino-2,3,7-trimethyl-quinoxaline | 1-hydroxy-4-methoxybenzene | blue |
| 5-amino-2,3-dimethyl-7 chloroquinoxaline | 2-hydroxynaphthalene | violet |
| 5-amino-2,3-dimethyl-7-chloroquinoxaline | 1-phenyl-3-methyl-5-pyrazolone | orange |
| 5-amino-2,3-dimethyl-7 chloroquinoxaline | 2,4-dihydroxy-1-benzoylbenzene | red |

We claim:

1. A process for the coloration of textile material of nickel-containing polypropylene, which comprises coloring said material with an azo-dyestuff of a formula selected from the group consisting of

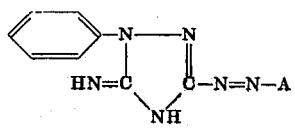

and

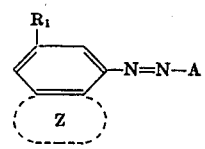

in which $R_1$ represents a member selected from the group consisting of chlorine, lower alkyl and lower alkoxy, Z represents a radial selected from the group consisting of

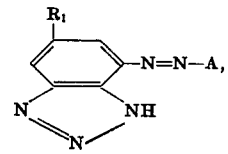

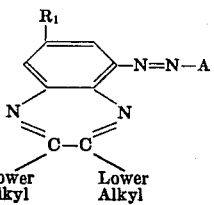

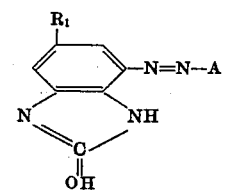

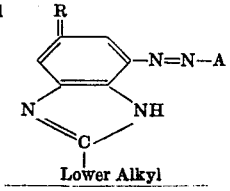

in which $R_1$ is a member selected from the group consisting of chlorine, lower alkyl, and lower alkoxy and A represents the radical of a coupling component selected from the group consisting of 1-hydroxy-4-halogen-benzene, 1-hydroxy-4-alkoxy-benzene, 1-hydroxy-4-alkyl-benzene, 3-hydroxy-diphenylamine, 2,4-dihydroxy-1-acylbenzene, 2-hydroxynaphthalene, 2-hydroxynaphthalene-3-carboxylic acid, 2-hydroxynaphthalene-3-carboxylic acid methyl ester, 2-hydroxycarbazole, 3-hydroxydiphenylene oxide and 1-phenyl-3-methyl-5-pyrazolone.

2. The process as claimed in claim 1, wherein said textile material is dyed at a temperature in the range from about 90° C. to about 140° C.

3. The process as claimed in claim 1, wherein said textile material is printed and subsequently steamed at a temperature in the range from about 101° C. to about 140° C.

4. The process as claimed in claim 1, wherein the coloration is performed at a pH — range between 2 and 11.

5. The process as claimed in claim 1, wherein the coloration is carried out along with a carrier.

6. The process of dyeing polypropylene fibers by applying to said fibers a dye with the following formula:

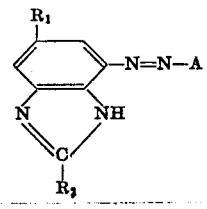

where A is an aromatic ring having a hydroxyl radial ortho to azo radial, $R_1$ is a chlorine or a methyl group and $R_2$ is a hydrogen or methyl group.

* * * * *